UNITED STATES PATENT OFFICE.

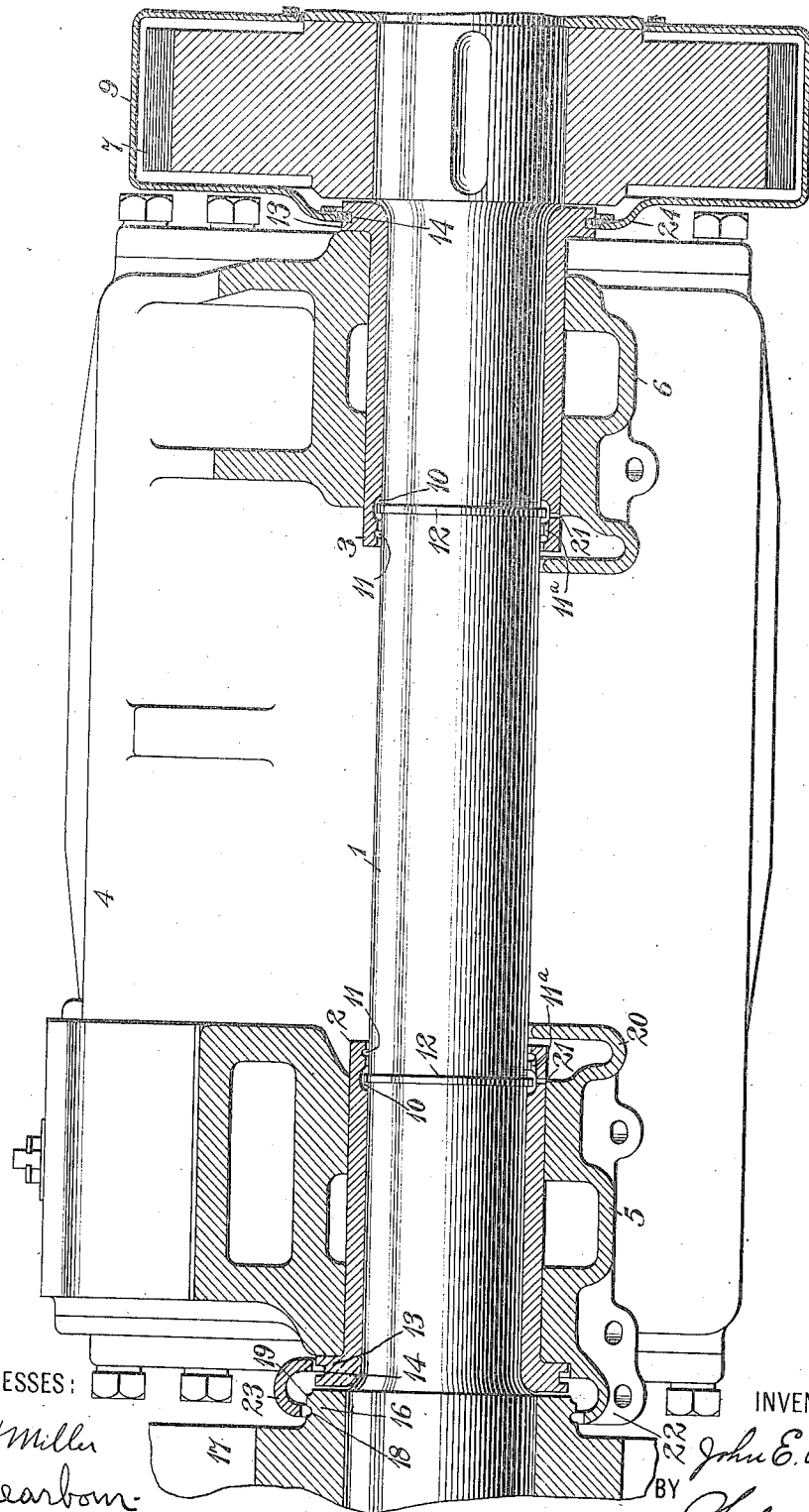

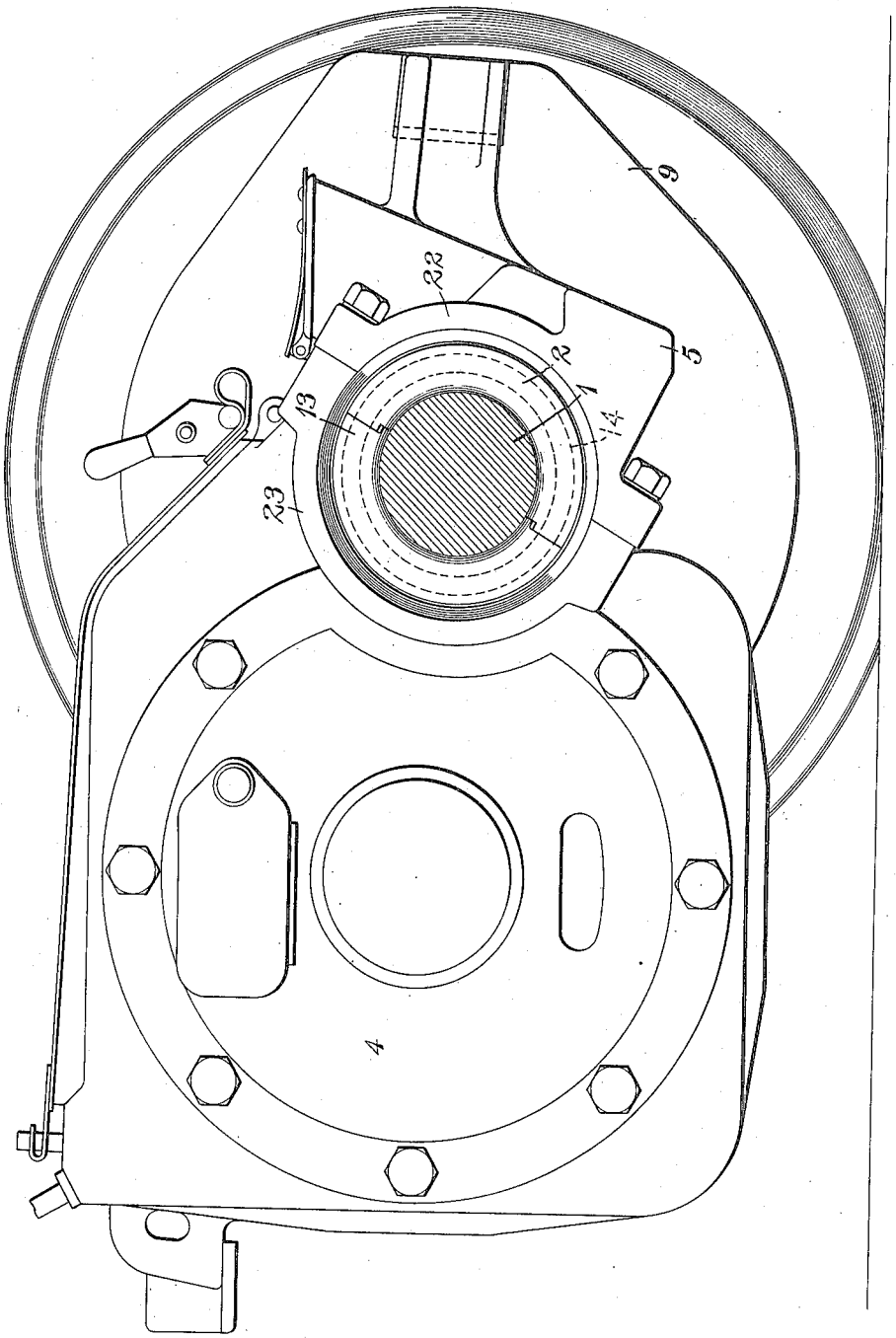

JOHN E. WEBSTER, OF PITTSBURGH, PENNSYLVANIA, ASSIGNOR TO WESTINGHOUSE ELECTRIC & MANUFACTURING COMPANY, A CORPORATION OF PENNSYLVANIA.

OIL-GUARD FOR DYNAMO-ELECTRIC MACHINES.

1,135,087.  Specification of Letters Patent.  Patented Apr. 13, 1915.

Application filed December 3, 1906. Serial No. 346,082.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Oil-Guards for Dynamo-Electric Machines, of which the following is a specification.

My invention relates to dynamo-electric machines, and has special reference to electric driving motors which are adapted for use with railway vehicles.

The object of my invention is to provide simple and effective means for preventing the lubricating fluid, used in the axle bearings, from overflowing onto the road-bed or other external objects, without interfering with the lubrication of the rotating parts.

In the accompanying drawings, Figure 1 is a sectional elevation through the center of a truck axle upon which a motor is supported by relatively stationary bearings, and Fig. 2 is an end elevation of the motor shown in Fig. 1, the axle being in section.

Referring to the drawings, a rotatable truck axle 1 supports a pair of similar bushings 2 and 3 that are stationary, relative to an electric motor 4 which is suspended therefrom and which is attached thereto by means of axle caps 5 and 6. The axle 1 is provided with a driving gear 7 which is engaged by a pinion keyed to the armature shaft of the motor in accordance with the usual practice and the engaging gears are protected, in the usual manner, by a stationary gear case 9. The inner ends of the bushings 2 and 3 are provided with annular grooves 10 and 11 and annular projections or oil rings 12 are fixed to the axle 1 so as to operate substantially in the centers of the grooves 10. The outer ends of the bushings are provided with flanges 13 in which annular grooves 14 are cut. The flange 13 of the bushing 2 is adjacent to a portion 16 of a truck wheel 17 that is provided with an annular groove 18. The flange 13 on the bushing 3 is adjacent to the hub of the gear 9. An annular projection 19 is formed on the hub projection 16 of the wheel 17 between the annular groove 18 and the flange 13 of the bushing 2. The axle cap 5 is fitted over the bushing 2 to engage the inner surface of the flange 13 and is provided with an oil guard 20 that projects beyond the inner extremity of the bushing 2 and is adapted to receive lubricating fluid which may escape from this end of the bushing. The bulk of the oil, which would otherwise flow out of the inner end of the bushing 2, will be thrown from the ring 12 into the annular groove 10 as the axle rotates. The groove 11 is connected with the groove 10 by a cross slot 11ª and the lower part of the groove 10 communicates with the space inclosed by the oil guard 20 through a hole or opening 21 in the bushing 2. The inner end of the bushing 3 is similarly provided with an oil guard which is adapted to receive the excess lubricating fluid from this end of the bushing. The oil guards on the inner ends of the bushings are located only at the lower part of the axle caps since they receive oil only from stationary parts. At the outer end of the axle cap 5, an oil guard 22 is provided which extends beyond the annular projection 19 on the wheel 17. This projection, in conjunction with a detachable semicircular guard 23, forms a complete annular groove which is adapted to receive the excess lubricating fluid which may escape from the outer end of the bushing 2 and which will be thrown from the annular projection 19, by centrifugal force, when the axle is rotating.

The lubricating fluid is prevented from escaping from the outer end of the bushing 3 by reason of the gear case 9 which is stationary and which is provided with a projection 24 that extends from the middle of the projection 13 and is sealed to the annular groove 14 in the bushing by any suitable packing, such as a strip of felt. This joint may readily be made oil tight since the two parts are relatively stationary.

It may be preferable in some motor designs to omit the oil tight bearing at this point, in which case the bushing will be extended so that the gear case will act as an oil catcher corresponding to the cup projection 22 and the guard 23 at the opposite end of the axle.

One of the advantages of the oil catcher lies in the fact that a considerable quantity of the lubricant, which would otherwise be wasted, is preserved and may be again used after being filtered or otherwise purified.

Although a specific arrangement is illustrated, my invention is not restricted thereto and I desire that only such limitations be imposed as are indicated in the appended claim.

I claim as my invention:

The combination with a rotatable axle, of a bearing bushing having an external integral grooved flange at its outer end, a rotatable member having an annular projection adjacent to and at one side of the bushing flange, and a stationary guard having an annular groove to receive lubricating fluid which may be thrown from said annular projection, the groove in said flange being located radially within the inside edge of said stationary guard to prevent the return of said fluid beyond said flange.

In testimony whereof, I have hereunto subscribed my name this 28th day of November, 1906.

JOHN E. WEBSTER.

Witnesses:
OTTO S. SCHAIVER,
BIRNEY HINES.